United States Patent [19]

Breen

[11] 4,438,476

[45] Mar. 20, 1984

[54] SELECTABLE INTEGRATING CHARACTERISTIC TIMER FOR PROTECTIVE RELAYS

[75] Inventor: Thomas B. Breen, Lansdowne, Pa.

[73] Assignee: General Electric Company, King of Prussia, Pa.

[21] Appl. No.: 378,589

[22] Filed: May 17, 1982

[51] Int. Cl.³ .......................................... H02H 3/093
[52] U.S. Cl. ...................................... 361/96; 361/97; 361/94
[58] Field of Search ....................... 361/94, 95, 96, 97, 361/93, 31, 196, 85; 307/590, 592, 269; 364/483, 480

[56] References Cited

U.S. PATENT DOCUMENTS

| | | | |
|---|---|---|---|
| 4,017,766 | 4/1977 | Vercellotti et al. | 361/94 X |
| 4,180,842 | 12/1975 | Keeney | 361/85 |
| 4,219,860 | 8/1980 | De Puy | 361/94 |
| 4,259,706 | 3/1981 | Zocholl | 361/96 |

Primary Examiner—Patrick R. Salce
Attorney, Agent, or Firm—John P. McMahon; William Freedman

[57] ABSTRACT

Disclosed is a characteristic timer for a protective relay which provides protection for a portion of an A.C. transmission line. The characteristic timer has digital logic elements adapted to external circuitry for selecting one or more desired phase angles which determines the activation time of a characteristic timer, which, in turn, determines the operational characteristic of the protective relay. The digital logic of the characteristic timer is further adapted to an external circuitry for selecting an integrating or non-integrating type function for the characteristic timer.

10 Claims, 5 Drawing Figures

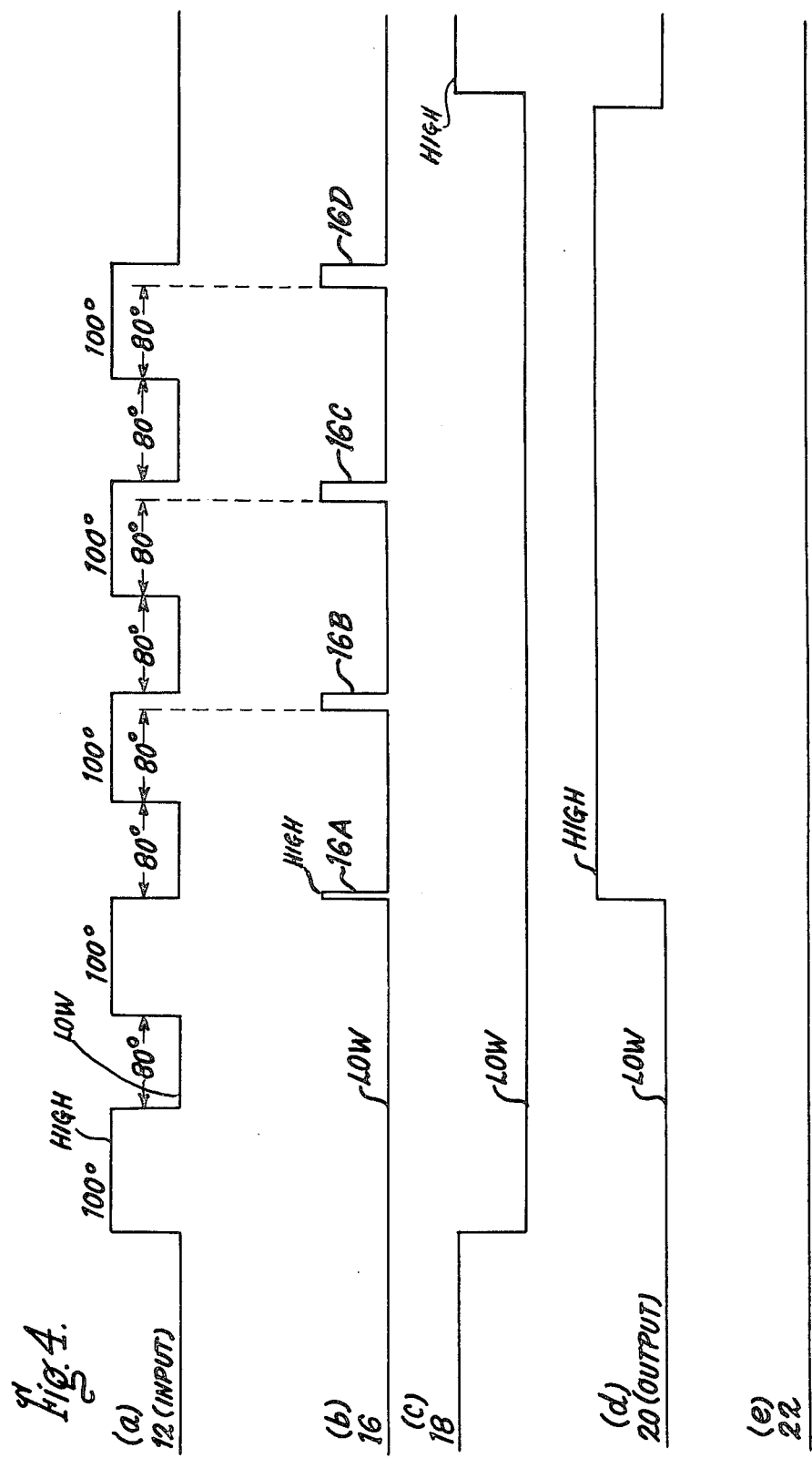

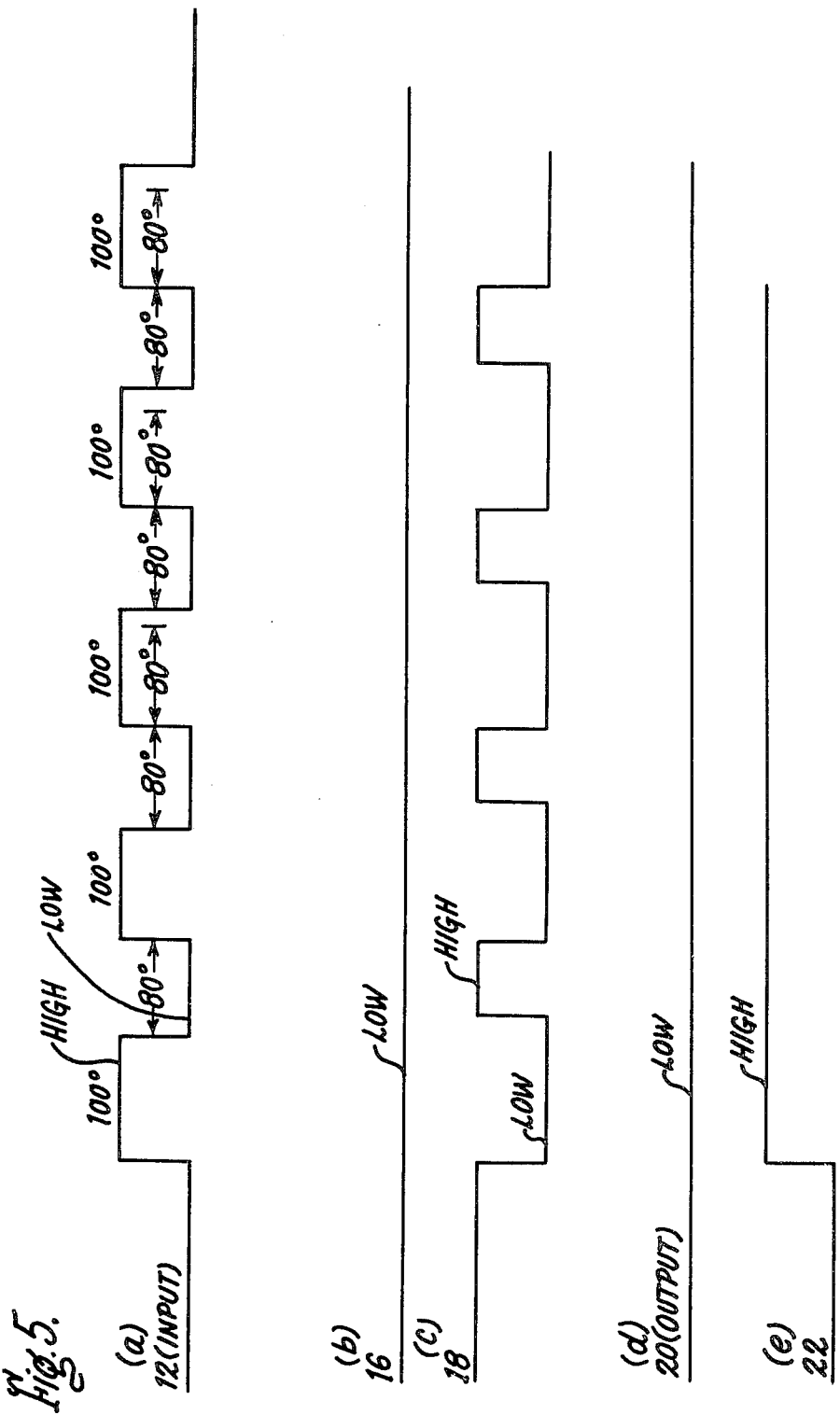

SELECTABLE INTEGRATING CHARACTERISTIC TIMER FOR PROTECTIVE RELAYS

BACKGROUND

This invention relates to a protective relay for protecting a portion of a high voltage transmission line, and more particularly, to a characteristic timer having one or more selectable activation times for a protective relay.

Characteristic timers are frequently employed in protective relays for determining the activation time of the protective relay. One such characteristic timer is described in my U.S. Pat. application Ser. No. 369,440, filed Apr. 19, 1982, assigned to the same assignee of the present invention and herein incorporated by reference.

U.S. Pat. application Ser. No. 369,440, referred to above, describes a characteristic timer having digital logic that is responsive to an external device for, among other things, (1) easily selecting a phase angle representative of the activation time of the protective relay, and (2) reducing the resetting time of the protective relay so as to reduce the resetting time of the protective relay system. Although my hereinbefore given U.S. Pat. application functions well for its desired objectives it is considered desirable that a characteristic timer be provided with further advantages, such as, (1) means for easily selecting at the same time one or more phase angles each representative of a desired activation time, (2) a selectable "integrating" or "non-integrating" function, (3) means for clearing or resetting the digital logic in response to an external fault condition, and (4) the similar advantage of my hereinbefore given U.S. Pat. application in that the protective relay has means for reducing its resetting time. The term "integrating" is meant to represent that the characteristic timer monitors an applied signal for more than one cycle of the applied signal and integrates the result. Conversely, "non-integrating" is meant to represent that the monitoring and the result of the characteristic timer are dependent on one-cycle of the applied signal.

Accordingly, objects of the present invention are to provide (1) means for easily selecting at the same time one or more phase angles each representative of a desired activation time of the characteristic timer, (2) an integrating or non-integrating type of operation for the characteristic timer selectable by an external input, (3) means for clearing or resetting the digital logic of the characteristic time in response to an external fault condition, and (4) a means for reducing the reset time of the protective relay.

These and other objects of the present invention will become apparent to those skilled in the art upon consideration of the following description of one form of the invention.

SUMMARY OF THE INVENTION

This invention is directed to a selectable characteristic timer for a protective relay of a protective relay scheme that provides protection for a transmission line.

The selectable characteristic timer measures the time duration of an applied signal representative of the normal or abnormal conditions of a portion of the transmission line associated with the protective relay. The characteristic timer measures the time duration of the applied signal relative to a quantity representative of the frequency of the power source supplying the transmission line. The characteristic timer comprises: (a) a clock source for developing a clock signal having a reference frequency; (b) a divider counter for receiving the clock signal and generating a clock pulse train comprising a plurality of pulses having a predetermined pulse repetition proportional to the frequency of the power source; (c) an up/down digital counter for receiving the applied and clock pulse train signals having a digital content that is altered, in response to the presence and the absence of the applied signal at a rate determined by the repetition rate of the clock pulse train, the up/down counter generating a first digital signal representative of its digital content; (d) selectable means for selecting one or more second digital signals each representative of a desired angle within the range of 0 to 180 degrees of one cycle of said power source; (e) comparator means rendered effective by said applied signal and responsive when effective to the first digital signal and one or more of the second digital signal for generating a SET signal when the first digital signal is equal to or greater than one of the second digital signals; and (f) means responsive to the SET signal for developing an output signal for the characterstic timer that extends past termination of said SET signal.

The features of the invention believed to be novel are set forth with particularity in the appended claims. The invention, itself, however, both as to its organization and operation, together with further objects and advantages thereof, may best be understood by reference to the following description taken in conjunction with the accompanying drawings.

BRIEF DESCRIPTION OF THE DRAWINGS

FIGS. 2 and 4 are timing diagrams related to the integrating type operation of the circuit arrangement of FIG. 1.

FIGS. 3 and 5 are timing diagrams related to the non-integrating type operation of the circuit arrangement of FIG. 1.

DETAILED DESCRIPTION OF THE PREFERRED EMBODIMENT

Figure 1:
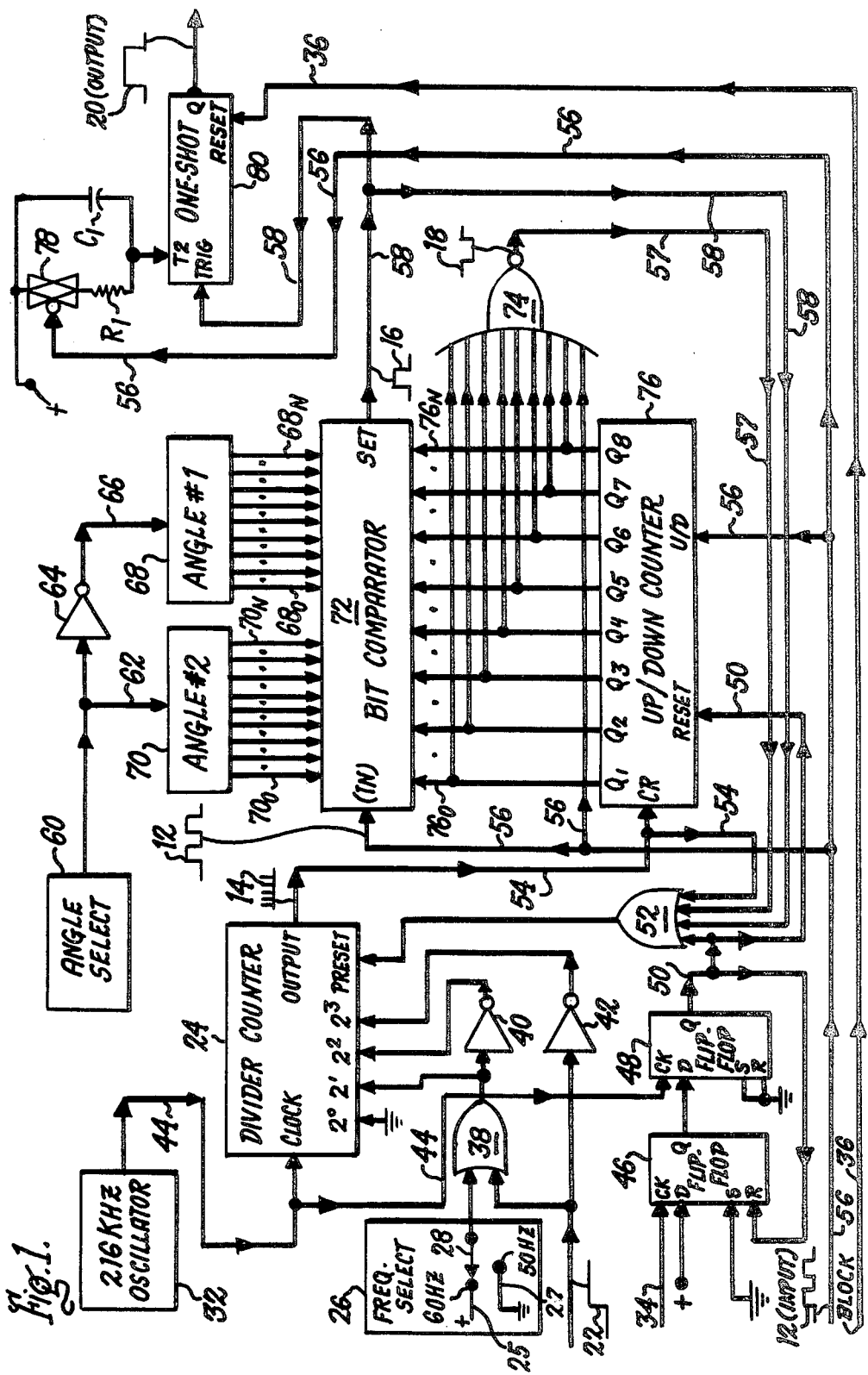
FIG. 1 is a block diagram of the circuit arrangement of the characteristic timer in accordance with the present invention.

FIG. 1 is a block diagram of the characteristic timer in accordance with the present invention. The characteristic timer is typically located on the output stage of the protective relay (not shown). The protective relay typically forms part of a scheme or system for protecting one or more portions of a transmission line (not shown).

In general, the characteristic timer of FIG. 1 develops an output signal 20 when the pulse width of an applied signal 12, developed by a protective relay (not shown), equal or exceeds one or more preselected limits selected from angle select networks 60, 68 and 70. As will be described hereinafter, the preselected limits determine the activation times of the characteristic timer, which, in turn determines the operating characteristics of the protective relay. Furthermore, the characteristic timer of FIG. 1 in response to a first control signal 22 developed by external circuitry (not shown) performs a selectable integrating or non-integrating operation to determine the pulse width of the applied signal 12. Further, the characteristic timer of FIG. 1 is responsive to a second control signal on signal path 34 developed by an external circuit (not shown) so as to clear its digital content upon the evolution of a fault condition detected by the external circuit. Still further, the characteristic timer of FIG. 1 has means for reducing the resetting time of the protective scheme for which the relay is utilized.

The applied signal 12 is developed by a portion (not shown) of the protective relay which monitors and responds to faults that may occur within the protected portion of the transmission line. One such protective relay is described in U.S. Pat. application Ser. No. 309,549 of L. P. Cavero, filed Oct. 7, 1981 now Pat. No. 4,405,966. This patent is assigned to the same assignee as the present invention and is herein incorporated by reference. U.S. Pat. application Ser. No. 4,405,966 describes a development of signals such as $V_{POL1}$ and $V_{OP1}$ having a desired phase relationship. The $V_{POL1}$ and the $V_{OP1}$ are applied to an AND circuit 61 having an output, which, in turn, is applied to a Timer 63, which, in turn, generates a trip command to an external breaker associated with a portion of the high voltage transmission line. The output signal of AND circuit 61 of U.S. Pat. No. 4,405,966 is similar to the applied signal 12 discussed for this invention and further one of the functions or usages of TIMER 63 of U.S. Pat. No. 4,405,966 is similar to one of the uses of a characteristic timer of FIG. 1 of the present invention in a protective relay.

The protective relay upon detection of a phase coincidence between two signals, such as $V_{POL1}$ and $V_{OP1}$, generates the signal 12 which is then applied to the characteristic timer of FIG. 1. The characteristic timer develops its output signal 20 after reaching one or more preselected limits relative to the occurrence of signal 12. The preselected limits are related to the pulse width of the applied signal 12, which, in turn, is related to the frequency of the A.C. power source supplying the transmission line. For example, a pulse width of signal 12 having a time duration of 4.16 msec corresponds to 90° of one-cycle of the 60 Hz power source. Similarly, a pulse width of approximately 5.0 msec corresponds to 90° of one cycle of a 50 Hz power source.

The pulse duration of the applied signal 12 is monitored and measured by the characteristic timer of FIG. 1. The characteristic timer of FIG. 1 has a plurality of elements listed in Table 1 according to the reference number, logic function, and typical type.

TABLE 1

| Element | Logic Function | Typical Type |
|---|---|---|
| 24 | Divider Counter | Motorola type 4526 |
| 28 | Switch | Conventional single pole two position switch |
| 38 & 52 | OR circuit | Conventional |
| 40, 42 & 64 | Logic inverter | Conventional |
| 46 & 48 | Flip-Flop | Motorola type 4013 |
| 60 | Presettable device | Electronic logic level means |
| 68 & 70 | Presettable devices | Conventional toggle double pole switches |
| 72 | Bit Comparator | Motorola type 4585 |
| 74 | NOR Circuit | Conventional |
| 76 | Up/Down Counter | Motorola type 4510 and 4516 |
| 78 | Analog Switch | RCA type 4016 |
| 80 | One-Shot | RCA type 4538 |

A clock source 32 of FIG. 1 generates a clock frequency signal of 216 k Hz derived from a crystal type oscillator having a typical base accuracy of ±0.001%. The clock source 32 may also be a phase locked loop circuit using a line frequency as an input to develop the desired 216 k Hz clock frequency signal. The clock source 32 develops a signal on signal path 44 which is routed to (1) a clock input of the Divider Counter 24 and (2) a clock (CK) input of Flip-Flop 48.

The Divider Counter 24 develops an output signal 14. The Divider Counter 24 performs one of three operations: (1) for an applied signal 12 relative to a 60 Hz application it divides the 216 k Hz signal from clock source 32 by a factor of 10 so as to produce an output signal 14 having a repetition rate of 21.6 k Hz, or (2) for an applied signal 12 relative to a 50 Hz application it divides the 216 k Hz signal from clock source 32 by a factor of 12 so as to produce an output signal 14 having a repetition rate of 18.0 k Hz., or (3) for a non-integrating operation, to be described, it divides an input signal by a factor of 2.0. The dividing operation of Divide Counter 24 is determined by the signal levels applied to its inputs $2^0$, $2^1$, $2^2$, and $2^3$ to be described. The Divider Counter 24 further has a PRESET input responsive to the output of an OR circuit 52. The output clock signal 14 of Divider Counter 24 is routed via signal path 54 to the clock (CR) input of UP/DOWN Counter 76 and a first input of the OR circuit 52.

The UP/DOWN Counter 76 is responsive to the applied signal 12 routed to its up/down (U/D) input. The presence or high condition of signal 12 causes the Up/Down Counter 76 to increment or increase its digital contents at a rate determined by the coincidence between the applied signal 12 and the clock signal 14. Conversely, the absence or low condition of signal 12 causes the UP/DOWN Counter 76 to decrement or decrease its digital contents at a rate determined by the presence of the clock signal 14. The value of the digital contents of the Up/Down Counter 76 is represented as a digital output signal via the outputs $Q_1$, $Q_2$, $Q_3$, $Q_4$, $Q_5$, $Q_6$, $Q_7$ and $Q_8$ of the Up/Down Counter 76.

The $Q_1$ ... $Q_8$ outputs are applied to data bus $76_O$ . . . $76_N$, respectively, which, in turn, are applied to (1) Bit Comparator 72, and (2) to eight (8) separate inputs to a nine (9) input NOR circuit 74. The ninth input to the NOR circuit 74 has applied to it, via signal path 56, the signal 12. NOR circuit 74 develops an output signal 18, in response to the absence or lack of any signal at either of its nine (9) inputs. The output signal 18 is routed to the second input of OR circuit 52 via signal path 57.

The Bit Comparator 72 is responsive to (1) the digital output signal of Up/Down Counter applied to data bus $76_O$ . . . $76_N$, and (2) one or more digital signals present on signal paths $68_O$ . . . $68_N$ and signal paths $70_O$ . . . $70_N$. The digital signals present on $68_O$ . . . $68_N$ and $70_O$ . . . $70_N$ are the respective outputs of Angle #1 (68) and Angle #2 (70) devices.

The Angle #1 device (68) and Angle #2 device (70) are respectively shown in FIG. 1 as single blocks, whereas, in actuality each of these devices is comprised of a plurality of switches, such as eight (8), switches. The usage of a single block for the Angle #1 device (68) and another for the Angle #2 device (70) in FIG. 1 is for clarity purposes.

The digital signals on data paths $68_O$ . . . $68_N$ of Angle #1 and on data paths $70_O$ . . . $70_N$ of Angle #2 are developed from the voltage potential supplied by the Angle Select 60 to Angle #1 via path 66 and to Angle #2 via path 62. The voltage supplied by Angle Select 60 to path 66 is of an opposite potential relative to path 62 due to the operation of Inverter circuit 64 interposed between paths 62 and 66. The digital signals on data paths $68_O \ldots 68_N$ and $70_O \ldots 70_N$ is dependent on the switch selections of Angle #1 and Angle #2, respectively, and the voltage potential representative of digital logic "1" or digital logic "0". Furthermore, the switches of Angle #1 and Angle #2 are selectable so that a plurality of desired phase angles may be selected for either Angle #1 or Angle #2. For example, if a phase angle of 90 degrees is desired for Angle #1 then the plurality of switches for Angle #1 are selected such that a positive (+) voltage potential is supplied by Angle #1 to data paths $68_1$, $68_3$, $68_4$ and $68_6$ so as to represent a binary value of 90 ($2^1+$, $2^3+$, $2^4+$, and $+2^6$). Similar manipulations for Angle #2 results in a desired 90 degree phase angle supplied by Angle #2. As will be further discussed the phase angles of Angle #1 and Angle #2 are relative to the frequency of the power source supplying the transmission line. Furthermore, as will be further discussed, Angle #1 and Angle #2 provide for the selection of separate characteristic angles, selected in degrees of phase angle, for phase-to-phase and phase-to-ground type faults that may occur within the transmission line with the protective relay utilizing the characteristic timer of the present invention.

As previously mentioned the digital contents of Angle #1 and #2 are respectively applied to Bit Comparator via paths $68_O \ldots 68_N$ and $70_O \ldots 70_N$. Bit Comparator 72 performs two operations in response to signal 12 applied to its input (IN): (1) it compares the first digital signal on paths $68_O \ldots 68_N$ or the second digital signal on paths $70_O \ldots 70_N$, whichever is activated, with the digital value output of the Up/Down Counter 76 applied to its signal paths $76_O \ldots 76_N$ and (2) when the result of the comparison of (1) is equal an output is produced at the Set output of the Comparator 72, thus generating the SET signal 16. SET signal 16 is applied to (1) Trigger (TRIG) input of One-Shot 80 via signal path 58, and (2) to a third input of OR circuit 52 via signal path 58.

The One-Shot 80 develops the output signal 20 of the characteristic timer of FIG. 1. The pulse width of the output signal 20 of the characteristic timer of FIG. 1 is primarily controlled, maintained, and extended by an $R_1C_1$ network connected to its T2 input of One-Shot 80. The $R_1C_1$ network is responsive to an Analog switch 78.

The $R_1C_1$ network and the Analog switch 78 operate in a similar manner as my previously mentioned U.S. Pat. application Ser. No. 369,440. Analog switch 78 has applied to its input the signal 12 and in response to the signal 12 allows bilateral conduction, during the absence of signal 12, from its first end connected to a positive (+) potential to its second end connected to one side of a resistor $R_1$. Resistor $R_1$ has its second side connected (1) to the T2 input of a One-Shot device 80, and (2) to one side of a capacitor $C_1$ having its other side connected to the same positive (+) potential which is coupled to Analog switch 78. The values of resistor $R_1$ and capacitor $C_1$ are selected to provide an energy storing means, $R_1C_1$, for accumulating a charge in response to the SET signal 16 output signal of the Bit Comparator 72. The SET signal 16 is applied to a TRIG input of One-Shot 80 which responds by coupling, via One-Shot 80, its T2 input to a zero potential. For this condition the capacitor $C_1$ has a charging path formed by one of its ends coupled to the positive (+) potential and its other end coupled to the zero potential, via the T2 input, so as to charge capacitor $C_1$ to the voltage potential existing between the positive (+) and zero potentials. The discharging path of capacitor $C_1$ is provided by resistor $R_1$ coupled to the positive (+) potential via the Analog switch 78. The Analog switch 78 is activated during the absence of signal 12 and thus the resistor $R_1$ provides the discharge path of the charged capacitor $C_1$ in response to the absence of the signal 12.

The network $R_1C_1$ has a predetermined time constant for the charging and discharging of the $R_1C_1$ network. The time constant of the $R_1C_1$ network establishes the resetting time, to be described hereinafter, desired for the protective relay. A typical value selected for $R_1$ is 220 K ohms, whereas, $C_1$ is selected to have a value of 0.027 mf.

The operation of One-Shot 80 in addition to its response to the signals applied to its T2 and TRIG input is further dependent upon the signal applied to its RESET input via signal path 36. The signal present on signal path 36 is a BLOCK signal which is to be described hereinafter.

As previously mentioned, the dividing operation performed by Divider Counter 24, is dependent upon the signals applied to its inputs $2^0$, $2^1$, $2^2$, and $2^3$. The signal present on input $2^0$ is fixed to a ground potential, whereas, the signals present on inputs $2^1$, $2^2$ and $2^3$ are variable and dependent upon the output signals developed by the circuit arrangement formed of Frequency Select 26, OR circuit 38 and two Logic inverters 40 and 42.

Frequency Select 26 is comprised of a two position (60 Hz or 50 Hz) single pole double-throw switch 28 having its first position 60 Hz connected to a positive (+) potential via path 25 and its second position 50 Hz connected to the ground potential via path 27. The positive (60 Hz) or negative (50 Hz) potential selected by Frequency Select 26 is applied to a first input of OR circuit 38.

OR circuit 38 has a second input that being a signal 22, to be described hereinafter, developed by an external circuit. OR circuit 38 develops an output signal in response to either of the signals applied to its inputs and the output signal of OR circuit 38 is applied to (1) the $2^1$ input of Divider Counter 24 and (2) to the input of Logic inverter 40.

Inverter 40 develops an output signal in response to absence or lack of the signal output of OR circuit 38. The output of Inverter 40 is applied to the $2^2$ input of Divider Counter 24.

The signal applied to the $2^3$ input of Divider Counter 24 is dependent on the signal developed by the Inverter 42. Inverter 42 develops an output in response to the absence or lack of signal 22.

The signal applied to the PRESET input of Divider Counter 24 is determined by the output signal developed by OR 52. The OR circuit 52 has a first input that being signal 14, a second input signal that being signal 18 present on signal path 57, a third input signal that being the Set signal 16 developed by the Bit Comparator 72, and a fourth input signal that being a signal present on signal path 50 which is developed by an arrangement of Flip-Flops 46 and 48.

Flip-Flop 46 develops an output signal at its Q output in response to the application or the presence of a signal, applied to its clock (CK) input, on signal path 34 generated by an external circuit (not shown) to be described hereinafter. The Flip-Flop 46 has further inputs those being a D input coupled to a positive (+) potential, a Set (S) input coupled to a ground potential and a Reset (R) input connected to the Q output of the Flip-Flop 48. The output signal of Flip-Flop 46 at its output Q is applied to a D input of Flip-Flop 48.

Flip-Flop 48 has applied to its clock (CK) input the clock signal developed by the 216 k Hz clock source 32. The Flip-Flop 48 has its inputs Set (S) and Reset (R) connected together and coupled to a ground potential. Flip-Flop 48 develops an output signal at its Q output which is routed, via signal path 50, to (1) the RESET (R) input of Flip-Flop 46, (2) the first input of OR circuit 50 and (3) the RESET input of the Up/Down Counter 76 of FIG. 1.

The operation of the Up/Down Counter of FIG. 1, and more completely, the operation of the circuit arrangement of FIG. 1 is best described with reference to FIGS. 2, 3, 4, and 5.

FIGS. 2, 3, 4, and 5 show six various waveforms of signals 12, 14, 16, 18, 20 and 22 related to the characteristic timer of FIG. 1.

Signal 12 is the previously described applied input signal 12 and is shown in FIGS. 2a, 3a, 4a and 5a as comprised of various pulse widths or blocks. The signal 14 developed by Divider Counter 24 is shown in FIGS. 2b and 3b as comprised of a plurality of strings of pulses. The repetition rate of pulses 14 corresponds to one-degree of the frequency of the power source supplying the transmission line. Signal 16, developed by the Bit Comparator 72, is shown in FIGS. 2c, 3c and 4b as comprised of a plurality of various pulse widths. Signal 18, developed by NOR circuit 74, is shown in FIGS. 2d, 3d, 4c and 5c as comprised of a plurality of various pulse widths. Signal 20, developed by One-Shot 80, is shown in FIGS. 2e, 3e, 4d and 5d as comprised of a plurality of various pulse widths. Signal 22, developed by an external source (not shown), is shown in FIGS. 2f, 3f, 4e and 5e as having one of two steady state values which are representative signals from an external source to command the characteristic timer to perform an integrating or non-integrating type measurement on the applied signal 12.

Figure 2:
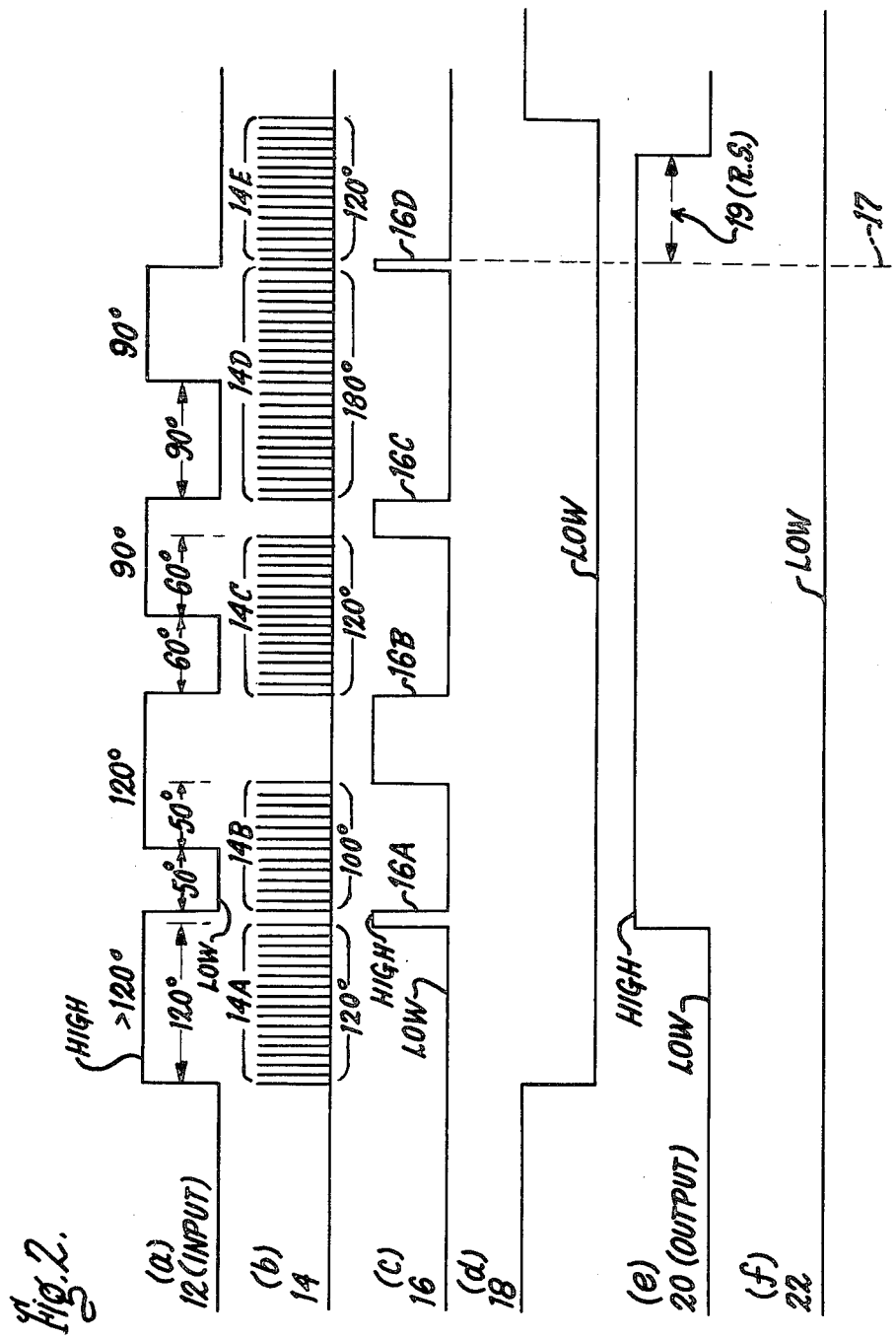

In general, the timing diagram of FIG. 2 is representative of an integrating type operation of the characteristic timer 10 of FIG. 1. The selection of an integrating type of operation of the characteristic timer of FIG. 1 is in response to the absence or Low condition of signal 22 of FIG. 2f. The integrating action is such that the Up/Down Counter 76 increments its digital content in response to the coincidence between the input signal 12 of FIG. 2a and the clock signal 14 of FIG. 2b, and conversely, decrements its digital contents in response to the absence or Low condition of signal 12 of FIG. 2a and at a rate determined by the clock signal 14 of FIG. 2b. For the operation shown in FIG. 2, the Angle #1 of FIG. 1 is set to a phase angle of 120 degrees.

FIG. 2a shows the signal 12 as comprising pulse widths or blocks of >120° (130°),120°, 90° and 90°.

FIG. 2b shows the signal 14 as comprised of five different groups ($14_A$, $14_B$, $14_C$, $14_D$, and $14_E$). The group $14_A$ is meant to represent that the accumulated number of pulses 14 corresponds to 120 degrees as shown in FIG. 2b, which is also the digital content of Up/Down Counter 76, and further which is also equal to the Angle #1. The Bit Comparator 72, which as previously described, compares the digital content of Up/Down Counter 76 with the digital contents of Angles #1 and #2, and in response to a condition manifested by the occurrence of the last pulse of group $14_A$ generates the first occurrence $16_A$ of signal 16 of FIG. 2c, which, in turn, is applied to the One-Shot 80, which, in turn, responds by the generation of signal 20 (OUTPUT) of FIG. 2e. Still further, the signal 16 is applied to the PRESET input of Divider Counter 24 which in turn responds by resetting itself which is shown by the absence or lack of pulses 14 separating group $14_A$ and group $14_B$ of FIG. 2b.

The group $14_B$ is shown in FIG. 2b as comprising a plurality of pulses 14 whose number or quantity corresponds to 100° of phase duration of signal 12. This group $14_B$ is smaller relative to group $14_A$ and is meant to represent that the contents of Up/Down Counter 76 are counted down for each occurrence of signal 14 during the absence or Low condition of signal 12, which is shown in FIG. 2a as separating the first block >120° and second block 120° of signal 12, and also the contents of Up/Down Counter 76 are counted up during the coincidence condition between the High condition of signals 12 and 14.

The group $14_B$ is meant to represent that the Up/Down Counter 76 has accumulated an up/down counting of its digital content so as to develop a value equal to the digital contents of Angle #1. The Bit Counter 72 responds to the group $14_B$ by generating its second occurrence $16_B$ of signal 16 which resets the Divider Counter 24 in a manner as described for $16_A$.

The group $14_C$ of FIG. 2b is shown as comprising a plurality of pulses 14 whose number or quantity corresponds to 120° of phase duration of signal 12. The group $14_C$ is responded to by Down Counter 76, and by Bit Comparator 72 in a manner as described for group $14_B$ and the Bit Comparator 72 generates the occurrence $16_C$ of FIG. 2c.

The group $14_D$ of FIG. 2b is shown as comprising a plurality of pulses 14 whose number or quantity corresponds to 180° of phase duration of signal 12. This larger group $14_D$, relative to either group $14_A$, $14_B$ or $14_C$, is meant to represent that the contents of Up/Down Counter 76 is counted down during the absence of signal 12, shown as a 90° duration between the third block (90°) and fourth block (90°) of FIG. 2a, and conversely, the UP/DOWN COUNTER 76 is counted up during the presence of the fourth block (90°) of signal 12. The phase duration of 180° is total time necessary for the UP/DOWN counter 76 to accumulate a digital content of 120°. The Bit Comparator 72 responds to the Up/Down Counter 76 accumulating a digital content of 120° in a manner as previously described, and generates the occurrence $16_D$ of FIG. 2c.

The occurrence $16_C$ is generated by the Bit Counter 72 when the digital contents of Up/Down Counter 76, relative to or updated from the previously described occurrence $16_B$, equal the digital contents of Angle #1. Similarly, the signal $16_D$ is generated by the Bit Comparator 72 when the digital contents of Up/Down Counter 76, relative or updated from the occurrence $16_C$, equal the digital content of Angle #1. Still further, it should be noted from FIG. 2c that the fourth occurrence $16_D$ is the last occurrence of signal 16.

The termination of the occurrence $16_D$ of FIG. 2c is shown in the bottommost portion of FIG. 2 as an event 17. The event 17 is further shown as being related to the terminal portion of signal 20 of FIG. 2e. The terminal portion of signal 20 of FIG. 2e is shown as having a duration 19 (R.S.) initiated at event 17 and terminated at the transition of signal 20 from its High to its Low condition. The duration 19 is the desired resetting time (R.S.) of the protective relay of the present invention and the description of the resetting time is similar to the previous description of my U.S. Pat. application Ser. No. 369,440 with the exception that resetting time of protective relay is primarily determined by the presence and absence of the applied signal 12.

In general, the resetting time of the protective relay of this invention is determined by charging and discharging of the energy storage means formed by the $R_1C_1$ network shown in FIG. 1 coupled to the T2 input of the One-Shot 80 which develops the signal 20 of FIG. 2e.

The signal 16 of Bit Comparator 72 which, as previously discussed, occurs when the accumulated digital contents of the Up/Down counter equal the digital contents of the Angles #1 or #2, is applied to the TRIG input of One-Shot 80. The One-Shot 80 responds to the signal 16 to cause two conditions: (1) it generates the signal 20, and (2) it couples its T2 input to a ground or zero voltage potential. The coupling of T2 to zero potential causes the capacitor $C_1$ to be charged to the value existing between the positive (+) and zero (0) potentials.

Signal 12 is coupled to and activates the Analog switch 78 which controls the $R_1C_1$ network. In particular, the absence of signal 12 causes the resistor $R_1$ to supply a discharge path for capacitor $C_1$. The discharge of $C_1$, coupled to the T2 input, causes the pulse width of signal 20 to be maintained and extended for a duration established by the time constant of $R_1C_1$ network.

The event 17 is initiated by the occurrence $16_D$ of FIG. 2c and causes the capacitor $C_1$ to be charged. The capacitor $C_1$ immediately begins its discharge due to the absence of signal 12 shown in FIG. 2a after the termination of the fourth block (90°). For this condition, capacitor $C_1$ is allowed to substantially discharge so as to no longer be capable of supplying energy to extend the pulse width of signal 20 so that signal 20 is allowed to return to its Low condition as shown in FIG. 2e.

The remaining waveform of FIG. 2 not previously discussed, is signal 18 of FIG. 2d. The signal 18 is shown in FIG. 2d as having a Low condition during the presence of either signals 12, 14, or 16. Conversely, the absence or lack of signals 12, 14, or 16 causes the signal 18 to return to its High condition. The High condition of signal 18 is indicative that the digital content of the Up/Down Counter 76 is equal to a zero condition. The counting down of Up/Down Counter 76 to its zero condition is shown in FIG. 2b by the pulses of group $14_E$.

Figure 3:
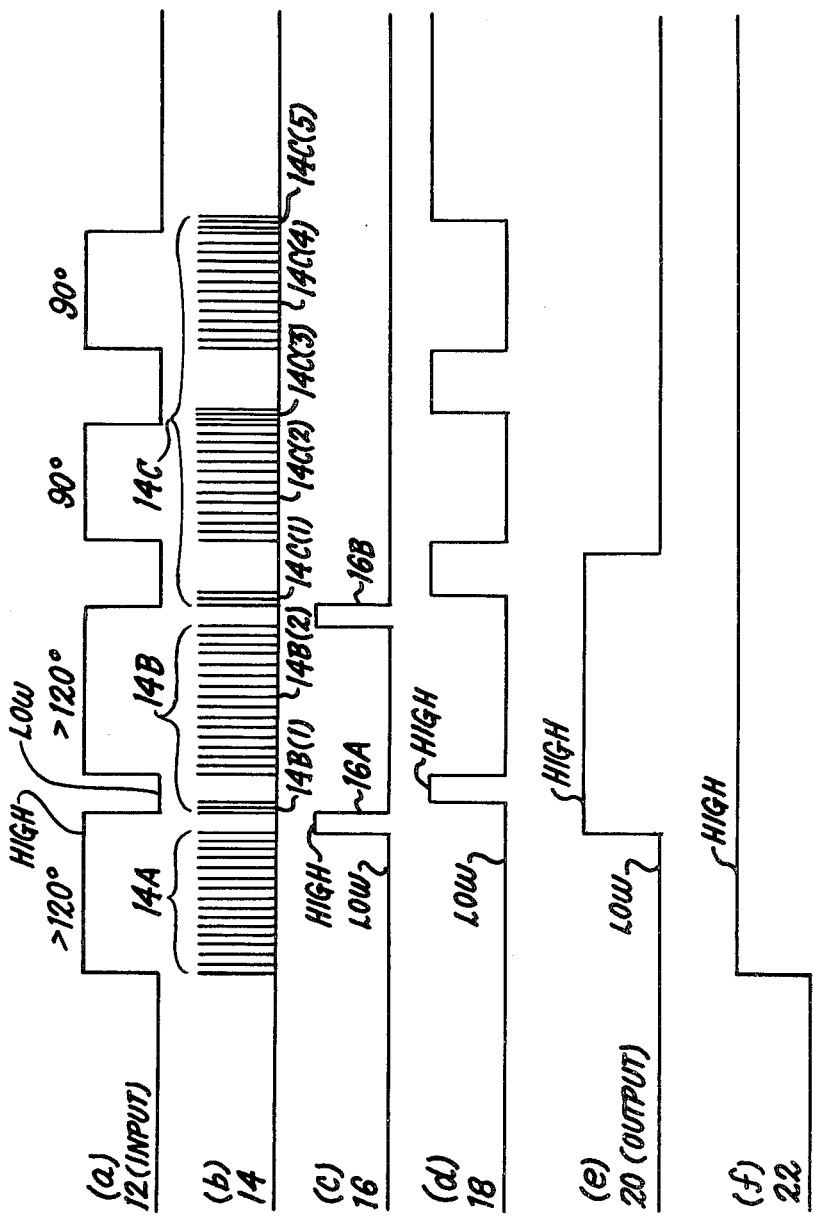

A further operation of the characteristic timer of FIG. 1 is shown in FIG. 3. The operation of the characteristic timer of FIG. 1 represented by the timing diagram of FIG. 3 is best described by comparing the occurrences of the signals shown in FIG. 3 against the occurrences of the previously described signals of FIG. 2. From this comparison it can be seen that the output signal 18, indicative of a zero condition of Up/Down Counter 76, of FIG. 3d occurs four times while the signal 18 of FIG. 2d occurs only once. A further comparison between FIGS. 3 and 2 reveals the pulse width of the output signal 20 of the characteristic timer 10, of FIG. 3e is of a reduced value relative to the signal 20 of FIG. 2e. This reduction in the pulse width of signal 20 of FIG. 3e is in response to the High condition of signal 22 of FIG. 3f and causes the circuit arrangement of FIG. 1 to perform a non-integrating type operation.

The High condition of signal 22 of FIG. 3f causes the down counting rate of Up/Down Counter 76, in response to the absence of signal 12, to be increased by a factor such as five (5). The digital logic of the characteristic timer of FIG. 1 which causes this increase are the OR circuit 38, and Inverters 40 and 42 all shown in FIG. 1. The High condition of signal 22 causes OR circuit 38 to (1) apply a signal to the $2^1$ input of Divider Counter 24, (2) inhibit the Inverter 40 from applying a signal to the $2^2$ input of Divider Counter 24, and (3) inhibit the Inverter 42 from applying a signal to the $2^3$ input of Divider Counter 24. The Divider Counter 24 responds to these changes applied to its inputs by altering its dividing factor of the 216 KHz from 10 to 2 which causes an increase in the pulse repetition rate of the output of Divider Counter 24 by a factor of 5. The increased rate of Divider Counter 24 is shown for signal 14 of FIG. 3b.

FIG. 3b is similar to FIG. 2b in that it shows three groups $14_A$, $14_B$, and $14_C$ of pulses 14; however the groups $14_B$ and $14_C$ of FIG. 3b are shown to have additional portions $14_{B(1)}$, and $14_{C(1)}$, $14_{C(3)}$ and $14_{C(5)}$ respectively. These portions $14_{B(1)}$, $14_{C(1)}$, $14_{C(3)}$ and $14_{C(5)}$ are shown in FIG. 3b as comprising of more closely spaced or a high granularity of pulses 14. These portions $14_{B(1)}$, $14_{C(1)}$, $14_{C(3)}$ and $14_{C(5)}$ occur in the timing diagram of FIG. 3 during the absence or non-presence of the applied signal 12 of FIG. 3a. The result of the increased down counting rate of the Up/Down Counter 76 in response to the High condition of signal 22 is that the circuit arrangement of FIG. 1 performs a non-integrating type of measurement on the applied signal 12.

FIG. 3a shows the first block of the applied signal 12 as having a High condition that is >120° of phase duration which is manifested by the occurrence of the group $14_A$ pulses of FIG. 3b having a total number of pulses equal to 120°, which, in turn, is responded to by the Bit Comparator 72 generation of the first occurrence $16_A$ in a manner as described with regard to FIG. 2. The generation of occurrence $16_A$ in turn causes the generation of the output signal 20 of the circuit arrangement of FIG. 1 shown in FIG. 3e by the transition of signal 20 from its Low condition to its High condition.

FIG. 3a further shows a transitional change of the first block of signal 12 from its High condition to its Low condition. The Low condition of signal 12 is responded to by the Divider Counter 24 generating a burst of the previously discussed high granularity pulses $14_{B(1)}$. The pulses $14_{B(1)}$ are meant to represent that the Up/Down counter has decremented its digital contents to a zero condition, which, is responded to by NOR circuit 74 generating the High condition of signal 18 of FIG. 3d.

FIG. 3a shows the occurrence of a second block of the applied signal 12 having a value of >120° of phase duration. The Up/Down Counter 76 responds to this second block by incrementing its digital contents to a value representative of 120° which is shown by the pulses $14_{B(2)}$ of FIG. 3b. The Bit Comparator 72 responds to the pulses $14_{B(2)}$ by the generation of the occurrence $16_B$ shown on FIG. 3c.

FIG. 3a further shows a transitional change of the second block of signal 12 to its Low condition which, in turn, is responded to by the Divider Counter 24 generation of the high granularity pulses $14_{C(1)}$ representative of a rapid down-counting of the Counter 76 to its zero condition in a manner as described for the pulses $14_{B(1)}$.

The zero condition of Counter 76 is responded to by NOR circuit 74 generation of the High condition of signal 18 of FIG. 3d.

FIG. 3a shows the occurrence of a third and fourth block both having a phase duration of 90°. The Up/Down Counter 76 responds to these third and fourth blocks by the generation of pulses $14_{C(2)}$, $14_{C(3)}$, $14_{C(4)}$, and $14_{C(5)}$. The Bit Comparator 72 responds to the pulses of the Counter 76 by maintaining the Low condition of signal 16.

A further operation of the characteristic timer of FIG. 1 is shown in FIG. 4. FIG. 4 is similar to the previously discussed FIGS. 2 and 3 except that the clock signal 14 is not shown. Still further, a difference between FIG. 4a and FIGS. 2a and 3a is that the input signal 12 of FIG. 4a has a periodic occurring block of 100°, whereas, the blocks of the previously discussed FIGS. 2a and 3a are >120°, 120°, 90° and 90°. Still further a comparison between FIG. 4b and FIG. 2c reveals that output signal 18 of FIG. 4c has a plurality of pulse widths, whereas, the signal 18 of FIG. 2d has a substantially constant pulse width. Still further, the output signal 20 of FIG. 4d has been substantially delayed relative to that of FIG. 2e.

The operation of the circuit arrangement of FIG. 1 shown on FIG. 4 is of an integration type function performed on the applied signal 12 of FIG. 4a. The operation of circuit arrangement shown in FIG. 4 is best described with reference to the blocks of FIG. 4a and to previously given description of Up/Down Counter 76, Bit Comparator 72 and NOR circuit 74.

The occurrence or High condition of the first block of signal 12 having a phase duration of 100° causes the Up/Down counter 76 to increment its contents to a value corresponding to 100°. The signal 12 then transitions to its Low condition for a duration of 80° causing the Counter to decrement its contents to a value corresponding to a value of 20° (100°−80°). The signal 12 then transitions to its High condition for a duration of 100° causing the Up/Down Counter to increment its contents to a value of 120° (20°+100°), which, in turn, is responded to by Bit Counter 72 generating the occurrence $16_A$, which, in turn, causes the signal 20 to transition from its Low condition to its High condition as shown in FIG. 4d.

FIG. 4a shows the second block of signal 12 to transition to its Low condition for a duration of 80° which is responded to by the Up/Down counter 76 decrementing its contents from 120° to 40°. FIG. 4a then shows the occurrence of a High condition of signal 12 as its third block of signal 12. When the third block obtains the duration of 80° the Up/Down Counter 76 has incremented its digital contents from 40° to 120°, which, in turn is responded to by the Bit Comparator 72 generation of occurrence $16_B$.

The Up/Down Counter 76 and the Bit Comparator 72 both responded to the fourth and fifth blocks of signal 12 of FIG. 4a in a manner similar to their response to the third block of signal 12 of FIG. 4a resulting in the occurrence $16_C$ and $16_D$ of FIG. 4b.

FIG. 4a shows the fifth block of signal 12 as being the last occurrence of signal 12. The Up/Down counter 76 in response to the Low condition of signal 12 then decrements its digital contents to a value less than 120° allowing the Bit Comparator 72 to maintain the Low condition of signal 16. Similarly, the Low condition of signal 12 allows the $R_1C_1$ to be substantially discharged which, in turn, allows the output signal 20 of the circuit arrangement 10 to transition from its High condition to its Low condition as shown in FIG. 4d.

From the circuit operation shown in FIG. 4 it should be appreciated that although a different block may be developed for applied signal 12, the operation of the characteristic timer of FIG. 1 is flexible and adjustable enough so as to supply a correct responsive action. The non-integrating action of the circuit of the characteristic timer of FIG. 1 is further shown by the timing diagram of FIG. 5.

FIG. 5 is similar to FIG. 4 except that the signal 22 of FIG. 5e is of a High condition rather than the Low condition of FIG. 4e. The characteristic timer of FIG. 1, in particular, the Up/Down Counter 76, in response to the High condition of signal 22 develops an increased repetition rate for counting down its digital contents in response to the Low condition of signal 12 in a manner as described for FIG. 3. The increased down counting of the Up/Down Counter 76 results in the digital contents of counter 76 never obtaining a value of 120°. The non-obtainment of this 120° value is responded to by the Bit Counter 72 maintaining its Low condition of signal 16, which, in turn, results in the maintenance of the output signal 20 of the characteristic timer of FIG. 1 in its Low condition as shown on FIG. 5d.

A further feature of the characteristic timer of FIG. 1 is its resetting capability in response to the signal present on signal path 34 which is developed by an external device (not shown). The signal developed by an external device which is present on signal 34 is applied to the (CK) input of Flip-Flop 46, which, in turn, generates an output signal at its Q terminal, which, in turn, is applied to the (D) input of Flip-Flop 48, which, in turn, generates an output signal at its Q terminal coupled to signal path 50.

The signal present on signal path 50 is applied to (1) OR circuit 52 which generates a signal applied to PRESET input of Divider Counter 24 causing the Divider Counter 24 to be unconditionally reset, and (2) to the RESET of the Up/Down Counter 76 causing the Up/Down counter 76 to be unconditionally reset. The unconditional resetting of the Divider Counter 24 and Up/Down Counter 76 corresponds to a reset condition of the characteristic timer of FIG. 1.

A still further feature of the characteristic timer 10 of FIG. 1 is its inhibition of its output signal 20 in response to a BLOCK signal present on signal path 36 which is developed by an external device (not shown). The BLOCK signal present on signal path 36 is applied to the RESET input of One-Shot 80. The One-Shot 80 in response to the BLOCK signal inhibits the generation of the output signal 20 of the circuit arrangement of FIG. 1.

The circuit arrangement of FIG. 1 having the various capabilities described hereinbefore may be used to provide the protective relay with a wide variety of features and operating characteristics. As discussed hereinbefore, the circuit arrangement of FIG. 1 may perform an integrating or non-integrating operation for measuring phase duration of the applied signal 12. Further, as previously mentioned, Angle #1 and Angle #2 of FIG. 1 provide for separate selection of a desired phase angle related to phase-to-phase and phase-to-ground type faults both type faults related to a distance type protective relay. The desired selected phase angle and the selectable integrating or non-integrating function both contribute to providing a protective relay with various desired operating characteristics.

It should now be appreciated that the characteristic timer 10 of the present invention comprised of digital devices provides the art of protective relays with (1) means for easily selecting at the same time one or more phase angles each representative of a desired activation time of the protective relay, (2) an integrating or non-integrating type of operation for the characteristic timer selectable by an external input, (3) means for clearing or resetting the digital logic of the characteristic timer in response to an external fault condition, and (4) means for reducing the resetting time of the protective relay.

It should be further appreciated that although the circuit arrangement of FIG. 1 has been described as having an integrating or non-integrating operation selectable by an external device, it may if desired have a fixed integrating or non-integrating operation. For such a fixed operation the up and down counting rates of the integrating type, the Up/Down Counter 76 previously described, would be of an equal value, whereas, for a non-integrating operation the down counting rate of the Up/Down Counter 76 would be greater than its up counting rate.

Still further, although three elements, Clock Source 32, Divider Counter 24, and Frequency Select 26 are shown in FIG. 1 and described for generating the clock signal 14, if desired these elements may be combined into one element so long as signal 14 is developed having a frequency proportional to the frequency of the power source which is supplying the transmission line.

While the invention has been particularly shown and described with references to several preferred embodiments thereof, it will be understood by those skilled in the art that various changes in form and detail may be made therein without departing from the true spirit and scope of the invention as defined by the appended claims.

What is claimed is:

1. A selectable characteristic timer which measures the time duration of an applied signal representative of the normal or abnormal conditions of a portion of the transmission line associated with the protective relay, said characteristic timer measuring the time duration of the applied signal relative to a quantity representative of the frequency of the power source supplying the transmission line, said characteristic timer comprising:
   (a) a clock source for developing a clock signal having a reference frequency;
   (b) a divider counter for receiving the clock signal and generating a clock pulse train comprising a plurality of pulses having a predetermined pulse repetition rate proportional to the frequency of the power source;
   (c) an up/down digital counter for receiving the applied and clock pulse train signals having a digital content that is altered in response to the presence and the absence of the applied signal at a rate determined by the repetition rate of the clock pulse train, the up/down counter generating a first digital signal representative of its digital content;
   (d) selectable means for selecting one or more second digital signals each representative of a desired angle within the range of 0 to 180 degrees of one cycle of said power source;
   (e) comparator means rendered effective by said applied signal and responsive when effective to the first digital signal and one or more of the second digital signals for generating a SET signal when the first digital signal is equal to or greater than one of the second digital signals; and,
   (f) means responsive to the SET signal for developing an output signal for the characteristic timer that extends past termination of said SET signal.

2. A selectable characteristic timer as defined in claim 1 of the non-integrating type in which:
   (a) the divider counter includes means for receiving a command signal from an external means;
   (b) the divider counter is capable of increasing the repetition rate of said clock pulse train to a second value greater than said predetermined value upon receipt of said command signal;
   (c) said up/down digital counter reduces its digital content at said second repetition rate in response to the absence of said applied signal.

3. A selectable characteristic timer of the non-integrating type which measures the time duration of an applied signal representative of the normal or abnormal conditions of a portion of the transmission line associated with the protective relay, said characteristic timer measuring the time duration of the applied signal relative to a quantity representative of the frequency of the power source supplying the transmission line, said characteristic timer comprising:
   (a) a clock source for developing a clock signal having a reference frequency;
   (b) a divider counter having means for receiving the clock signal and a command signal from an external means, the divider counter generating a clock pulse train signal having a first and a second repetition rate, the second repetition rate being adapted to be activated by the command signal and having a value greater than the first repetition rate;
   (c) an up/down digital counter for receiving the applied and clock pulse train signals having a digital content that is altered at a rate controlled by the first and second repetition rates of the clock pulse train in response to the presence and the absence, respectively, of the applied signal, the up/down counter generating a first digital signal representative of its digital content;
   (d) selectable means for selecting one or more second digital signals each representative of a desired angle within the range of 0 to 180 degrees of one cycle of said power source;
   (e) comparator means rendered effective by said applied signal and responsive when effective to the first digital signal and one or more of the second digital signals for generating a SET signal when the first digital signal is equal to or greater than one of the second digital signals; and,
   (f) means responsive to the SET signal for developing an output signal for the characteristic timer that extends past termination of said SET signal.

4. The selectable characteristic timer as defined in claims 1 or 3 in which said comparator means detects which one or more second digital signals is active and compares the active second signal with the first digital signal and generates the SET signal when the comparison equals or exceeds the first digital signal.

5. The selectable characteristic timer of claims 2 or 3 wherein said second repetition rate is at least several times greater than said first repetition rate.

6. The selectable characteristic timer of claims 1, 2, 3, 4, or 5 wherein the up/down digital counter further receives a reset signal, said reset signal being developed by means responsive to an external means, said developed reset signal causing the unconditional resetting of the digital content of the up/down digital counter and the divider counter.

7. The selectable characteristic timer of claims 1, 2, 3, 4, or 5 where said means responsive to SET signal is further responsive to a BLOCK signal generated by external means so as to inhibit the development of said output signal of the characteristic timer. pg,35

8. A selectable characteristic timer as defined in claim 1 in which said up/down digital counter increases its digital content in response to the presence of said applied signal and reduces its digital content in response to the absence of said applied signal.

9. A characteristic timer as defined in claim 8 and of the integrating type in which the up/down digital counter reduces its digital content at the same rate as it increases its digital content.

10. A characteristic timer as defined in claim 8 and of the non-integrating type, the timer further comprising means controlled by a command signal for increasing the repetition rate of said clock pulse train in response to the presence of said command signal and thereby causing the rate at which said up/down digital counter reduces its digital content to be higher than the rate at which said up/down counter increased its digital content.

* * * * *